United States Patent

Do et al.

[11] Patent Number: 6,061,666
[45] Date of Patent: *May 9, 2000

[54] AUTOMATIC BANK TELLER MACHINE FOR THE BLIND AND VISUALLY IMPAIRED

[75] Inventors: Cuong Do, Woodland Hills; Michael Merman, Santa Monica, both of Calif.

[73] Assignee: Citicorp Development Center, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/768,289

[22] Filed: Dec. 17, 1996

[51] Int. Cl.$^7$ ..................................................... G06F 17/60
[52] U.S. Cl. ............................................. 705/43; 235/379
[58] Field of Search .............................. 705/43; 235/379, 235/380, 381, 382

[56] References Cited

U.S. PATENT DOCUMENTS

| | | | |
|---|---|---|---|
| 4,134,537 | 1/1979 | Glaser et al. | 235/379 |
| 4,593,183 | 6/1986 | Fukatsu | 235/379 |
| 4,760,245 | 7/1988 | Fukaya | 235/379 |
| 5,053,758 | 10/1991 | Cornett et al. | 340/712 |
| 5,185,515 | 2/1993 | Nishibe | 235/379 |
| 5,376,947 | 12/1994 | Kurodo | 345/173 |
| 5,382,777 | 1/1995 | Yuhara et al. | 235/379 |
| 5,412,189 | 5/1995 | Cragun | 235/379 |
| 5,589,855 | 12/1996 | Blumstein et al. | 345/174 |
| 5,836,818 | 11/1998 | Jones et al. | 463/29 |

OTHER PUBLICATIONS

"The Talking Fingertip Techniques", website: http://www.trace.wisc.edu/text/kiosks/t_finger.html, retrieved Feb. 20, 1998 (3 pages).

"About the Trace Center", website: http://trace.wisc.edu/about/, retrieved Feb. 20, 1998 (6 pages).

"Designing More Usable Kiosks, ATMs & ITMs", website: http://www.trace.wisc.edu/world/kiosks/, retrieved Feb. 20, 1998 (2 pages).

"EZ Access Interface Techniques", website: http://www.trace.wisc.edu/world/kiosks/ez/index.html, retrieved Feb. 20, 1998 (2 pages).

"EZ Access Executive Summary", website: http://www.trace.wisc.edu/world/kiosks/ez/executive_summary.html, retrieved Feb. 20, 1998 (1 page).

"Information for Making Kiosks, ATMs and ITMs Accessible", website: http://www.trace.wisc.edu/world/kiosks/itm/information.html, retrieved Feb. 20, 1998 (2 pages).

"Designing a More Usable World For All", website: http://www.trace.wisc.edu/world/, retrieved Feb. 20, 1998, (1 page).

"Designing Universal/Accessible Kiosks & ATMs", website: http://www.trace.wisc.edu/world/ksk_nav.html, retrieved Feb. 20, 1998 (1 page).

Primary Examiner—Allen R. MacDonald
Assistant Examiner—Alexander Kalinowski
Attorney, Agent, or Firm—Kilpatrick Stockton LLP; George T. Marcou; James J. Bindseil

[57] ABSTRACT

An automatic bank teller machine (ATM) that uses a combination of simple visual cues, large-type visual displays, audio, and a touch-sensitive display screen to facilitate use of the ATM by the blind and visually impaired, while still being useful for the sighted. In particular, the ATM uses a touch-sensitive display screen that has a fixed, easy to locate touch scanning zone. The display screen operates by contacting the screen, with a fingertip, for example, and slidingly moving to a location on the touch scanning zone corresponding to an item to be input, such as one of the numbers 0 to 9, for example.

39 Claims, 8 Drawing Sheets

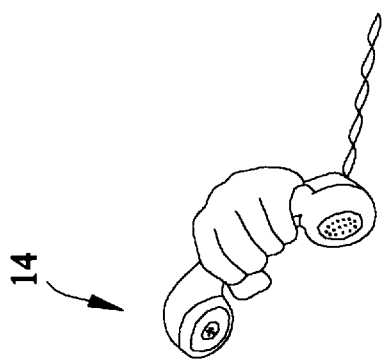
FIG. 3

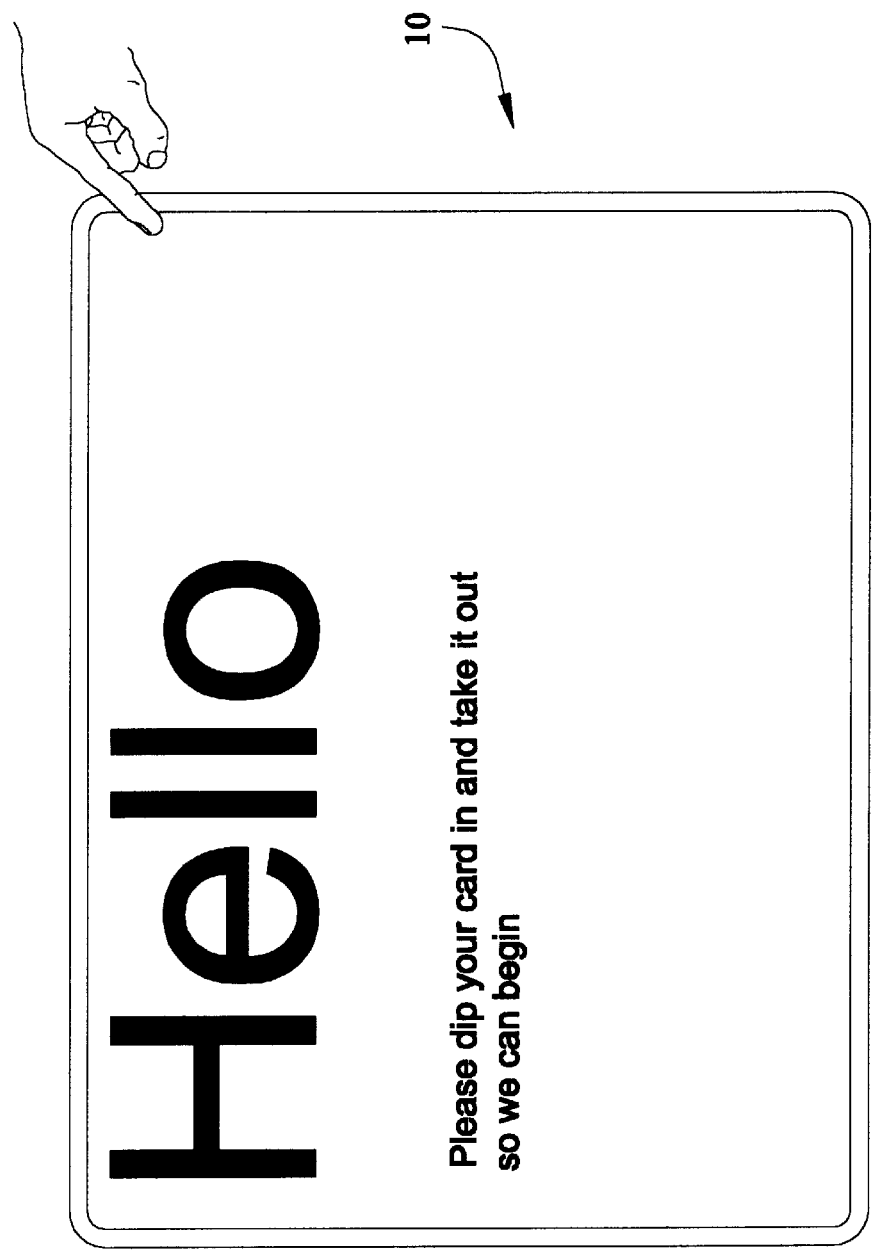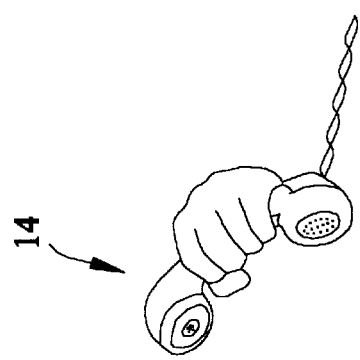
FIG. 4

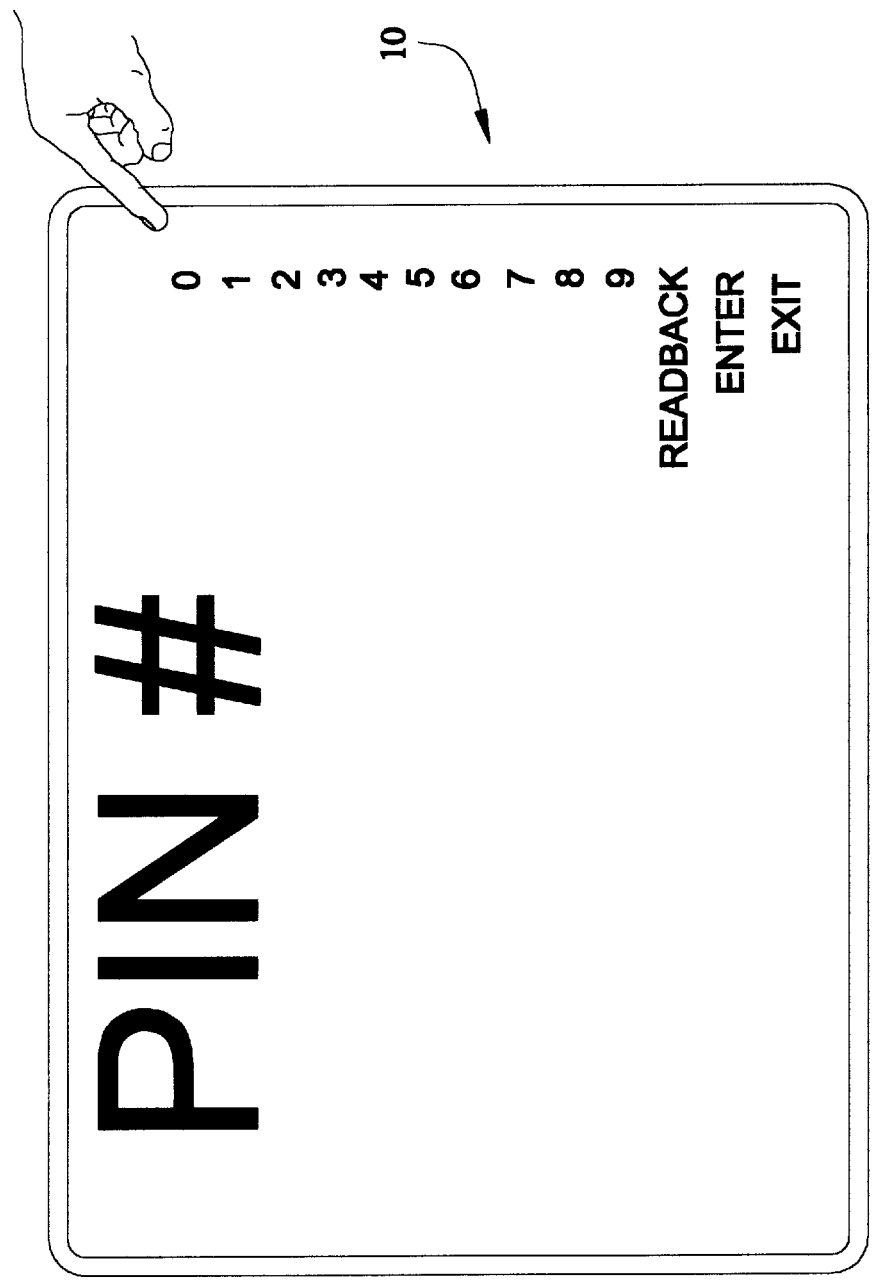
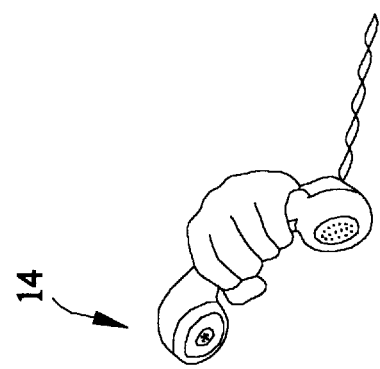
FIG. 7

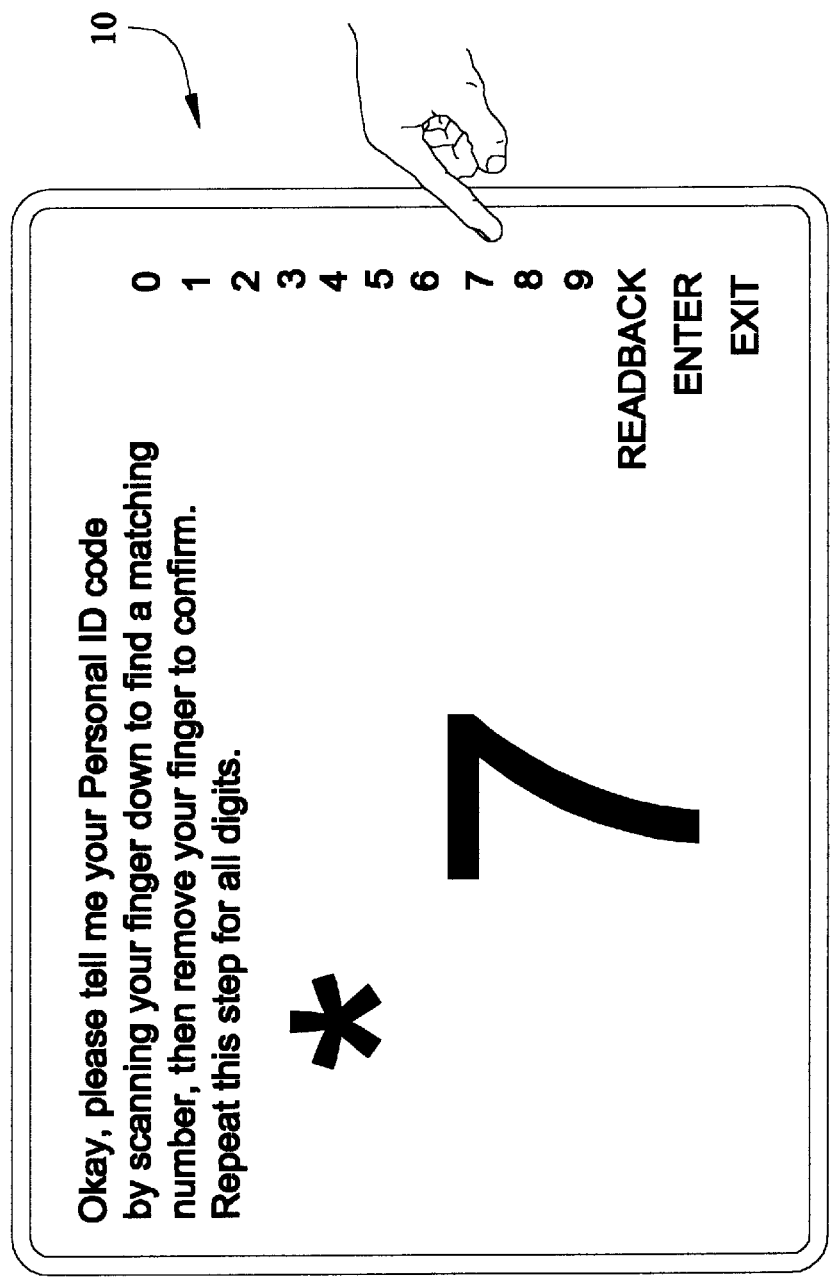
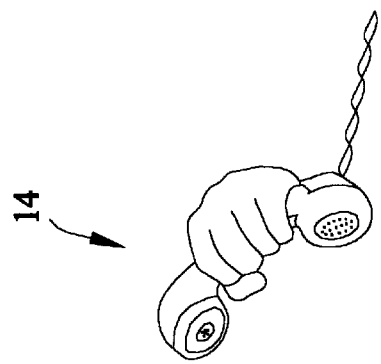
FIG. 8

AUTOMATIC BANK TELLER MACHINE FOR THE BLIND AND VISUALLY IMPAIRED

This application is a continuing prosecution application of U.S. patent application Ser. No. 08/768,289 filed Dec. 17, 1996.

FIELD OF THE INVENTION

This invention relates to automatic bank teller machines ("ATMs"), and particularly relates to an ATM that is specially adapted to facilitate use by the blind and visually impaired.

DESCRIPTION OF RELATED ART

Automatic bank teller machines (ATMs) are becoming increasingly popular because they make banking functions available to customers virtually around the clock, and at a variety of locations, in addition to bank branches.

However, conventional ATMs are typically operable through the use of keypads and visual display screens, both of which typically use displays, lettering, or labelling that are so small as to create difficulties for those with vision impairment, not to mention for those who are substantially blind. The use of Braille instructions placed on ATMs is generally known. However, this does not address the difficulty that a blind or visually impaired person has in terms of knowing, for example, when to enter a withdrawal amount, when (and where) to insert a deposit envelope, etc., in the course of operating the ATM.

Commonly owned U.S. Pat. No. 5,589,855 to Blumstein et al., discloses a method and apparatus by which a multi-digit number may be apparatus by which a multidigit number may be entered, using a touch screen. According to Blumstein et al., a touch screen is divided into a plurality locations, whereby a first location is touch a number of times equal to a digit of the multidigit number, followed by touching a second location. When all of the digits of the multidigit number are entered in this manner, a third location on the screen is touched.

Touch screens can be most generally considered coordinate tracking devices, in the sense of tracking contact with the screen relative to, for example, a representation of a "button" displayed on the screen. Commonly owned U.S. patent application Ser. No. 08/655,922 to Yokomoto et al., the disclosure of which being incorporated herein by reference, describes one embodiment of a touch screen that uses emitters and corresponding sensors on the left and right sides and top and bottom sides of the screen. By registering where, for example, a finger blocks a sensor in both vertical (top/bottom) and horizontal (left/right) positions, the position of the touch on the screen can be mapped in terms of X-Y coordinates.

SUMMARY OF THE INVENTION

Accordingly, it is an object of the present invention to provide an ATM that facilitates use thereof by both the blind and the visually impaired.

Generally, the ATM according to the present invention provides a plurality of audible cues, including verbal instructions, to guide a blind or visually impaired customer through the steps of the operating the ATM. These audible cues may be supplemented by providing a plurality of coarse visual cues to further guide the use of the ATM. The term "coarse" here refers to visual cues, such as light-emitting indicators associated with respective parts of the ATM (the cash dispenser slot, the bank card reader, the transaction record printer, etc.) or large-type text displays, which are relatively easy to perceive and which are well-suited for visually impaired persons with diminished visual acuity.

The basic feature of the ATM, however, is the provision of a touch-sensitive visual display screen. The visual display screen acts as a customer input/output interface. In particular, the visual display screen is adapted to recognize an input corresponding to the action of contacting the screen, then, while maintaining contact with the screen, moving to a location on the screen that corresponds to a specific input selection. Thereafter, when contact is broken at that location, the given input selection is recognized. Preferably, the screen displays an icon or the like at the mapped location so as to visually indicate the input selection.

BRIEF DESCRIPTION OF THE DRAWINGS

The present invention is described hereinbelow with reference to the figures appended hereto, in which:

FIG. 3 illustrates an initial display on the display screen, prior to a customer beginning a transaction;

FIG. 4 illustrates a variant of the initial display shown in FIG. 3, wherein at least some of the text is enlarged;

FIG. 7 illustrates a screen display similar to that shown in FIG. 6, but using large-type text;

FIG. 8 illustrates a screen display associated with the actual process of entering an input selection.

DESCRIPTION OF THE PREFERRED EMBODIMENT

Generally, the ATM according to the present invention includes a number of standard components that are conventionally associated with ATMs. These include an access control device like a magnetic stripe card reader, a cash dispensing mechanism, a deposit intake mechanism, a transaction record printer, and a customer input/output interface. The ATM as a whole is connected in a conventional manner to a financial data network (not illustrated), by which the ATM is connected to a bank's central computers and the like.

Figure 1:
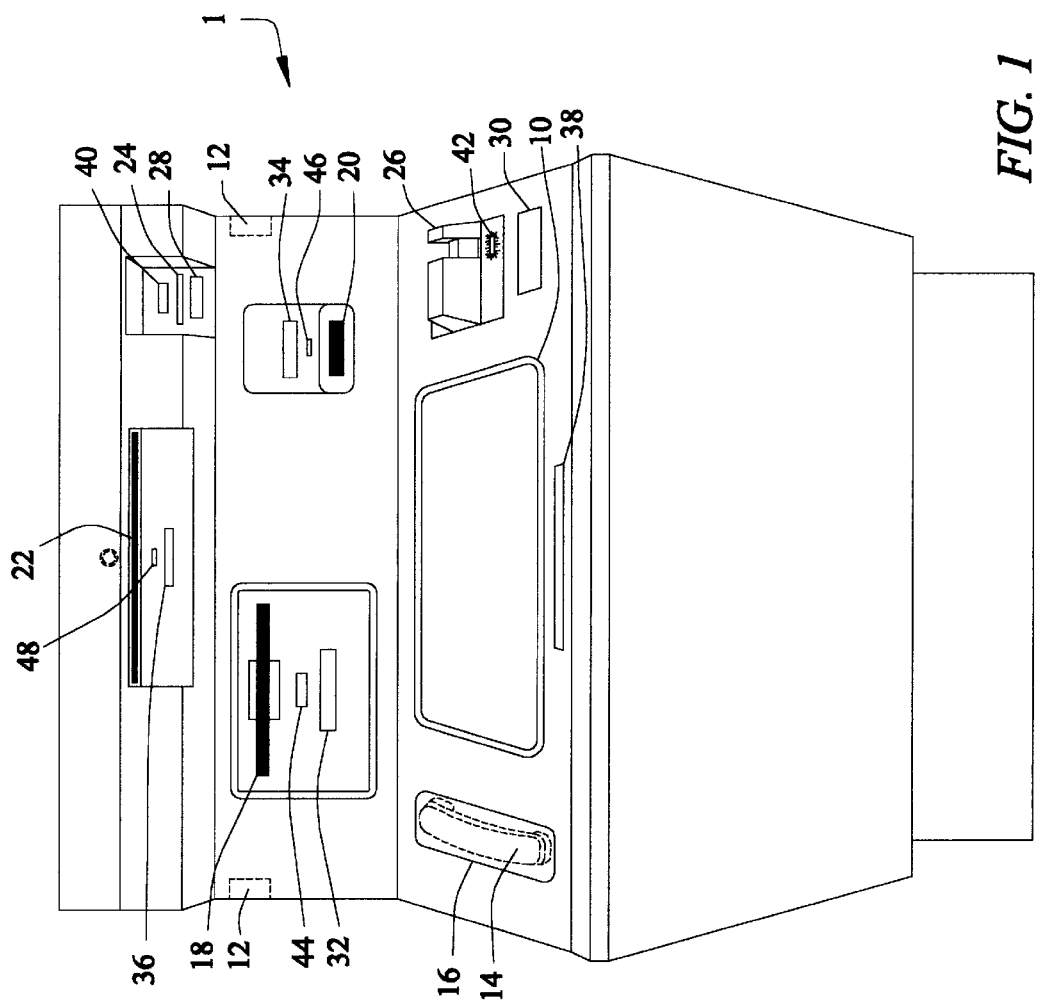
FIG. 1 is a front view of an ATM according to the present invention.

FIG. 1 is a front view of an ATM 1 according to the present invention. Although ATM 1 is shown as having a cabinet-type construction, the present invention equally applies to an ATM built into a wall portion. Indeed, the particular physical configuration of the ATM, within the bounds of the description set out below, is immaterial to the nature of the present invention.

A customer can access ATM functions via an access control device, such as a magnetic stripe card reader. ATM 1, according to the present invention, includes one or both of a conventional transport-type card reader 24, and a conventional dip-type card reader 26.

ATM 1 also includes a customer input/output interface through which a customer interacts with the ATM. The input interface includes a touch-sensitive screen 10, which is described in detail below. The output interface includes an audio device (not shown here) which emits sound through at least one speaker. In FIG. 1, right and left channel speakers 12 are provided to broadcast a welcoming greeting, initial instructions for using the ATM, etc. ATM 1 is further provided with a speaker provided in a handset 14, whereby more private information, such as specific transaction details, and the like, are made audible only to the customer currently using the ATM. Speakers 12 may be omitted as desired, such that the handset 14 is additionally used to broadcast a welcome message, etc. Handset 14 is mounted in, for example, a retaining compartment 16.

ATM 1 further includes a conventional cash dispensing mechanism 18 that dispenses cash via a cash dispensing slot. ATM 1 may additionally, or alternatively, include a conventional deposit intake mechanism 20.

Finally, a conventional transaction record printer 22 is provided for printing a record or receipt of a customer's banking transaction.

ATM 1 is particularly adapted for use by the blind and visually impaired using a combination of simple, relatively easy to visually perceive indicators that indicate when the respective components of the ATM are in use, a visual display screen 10 actuable by a simple sliding motion, and audio feedback to the customer.

The card readers 24, 26, the cash dispensing mechanism 18, the deposit intake mechanism 20, and the transaction record printer 22 may be provided with corresponding Braille text labels 28, 30, 32, 34, 36, respectively, to help identify each component, in contrast to providing a generic, non-specific set of Braille text instructions, as is conventionally known. The visual display screen 10 is also identified by a corresponding Braille text label 38.

The card readers 24, 26, the cash dispensing mechanism 18, the deposit intake mechanism 20, and the transaction record printer 22 are each additionally provided with a selectively actuable visual signaling indicator 40, 42, 44, 46, 48, respectively. In particular, these signaling indicators take the form of selectively actuable lights, such as, for example, conventionally-known light emitting diodes. It is a particular feature of the present invention to provide signaling indicators 40, 42, 44, 46, and 48 that are actuated in correspondence with activity taking place at a respective component of the ATM. For example, when the customer is supposed to take cash from the cash dispensing mechanism 18, the signaling indicator 44 associated therewith is illuminated. Or, for example, when the transaction record printer 22 prints out a transaction record, the signaling indicator 48 associated therewith is illuminated.

Preferably, the signaling indicators are illuminated in a sequence corresponding to the steps of a given banking transaction, such as making a deposit, withdrawing money, etc., thereby guiding the customer through operating the ATM. More specifically, it will be appreciated that a simple illuminated indicator is more readily perceived by a visually impaired customer, compared to, for example, text displays of instructions for use. Accordingly, a visually impaired customer can readily benefit from this feature.

This above-described effect of the signaling indicators may be supplemented by verbal instructions (for example, "Please take your cash now.") transmitted via the handset 14, or via speakers 12.

Figure 2:
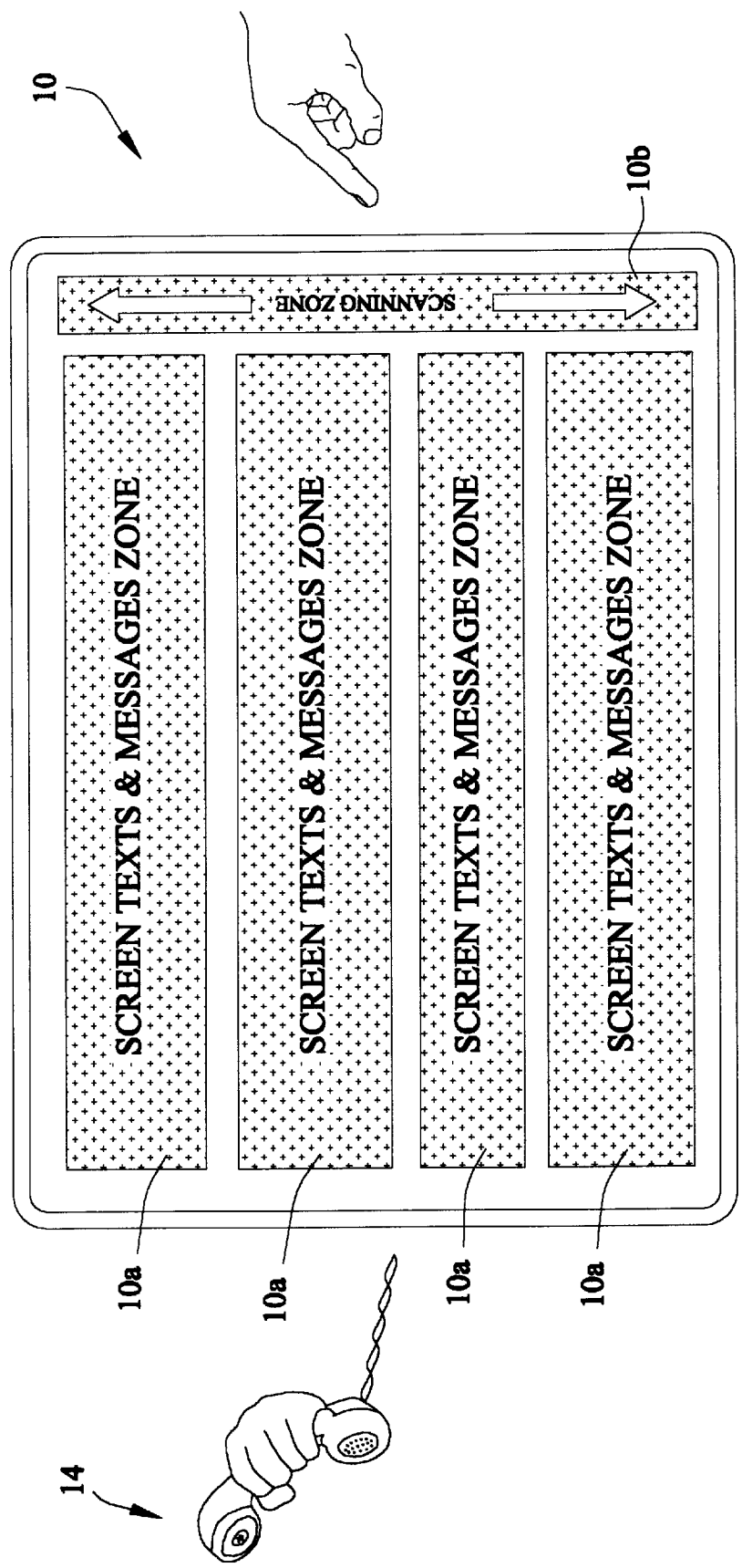
FIG. 2 is a schematic view of the touch-sensitive display screen according to the present invention.

FIG. 2 illustrates more closely illustrates display screen 10. In particular, FIG. 2 schematically illustrates portions 10a of the display screen 10 that are adapted to display visual information (e.g., text or icons), and a touch scanning zone 10b.

Touch scanning zone 10b generally operates like known touchsensitive display screens, wherein pressure on the surface of the screen establishes an electrical contact with an underlying substrate, thereby generating a manipulable electrical signal. Also, the aforementioned emitter-sensor arrangement of Yokomoto et al. could be used. Touch scanning zone 10b according to the present invention more particularly operates by contacting the zone 10b, using, for example, a fingertip, and thereafter sliding the fingertip along the surface of the zone 10b to an area corresponding to a desired input item. Thereafter, the step of breaking contact (i.e., lifting the fingertip) from the zone 10b at that area corresponding to the desired input, generates a signal corresponding to that input. Thus, according to the present invention, the touch screen sense a "track" of coordinates along which the sliding contact is maintained, rather than a single coordinate corresponding to a "pushing a button"-type contact.

In FIG. 8, for example, the fingertip is slidingly moved down the touch scanning zone onto or adjacent to, in this case, the numeral "7" displayed therealong. The action of lifting the fingertip from the screen at that point causes the ATM to recognize that a "7" has been input.

It will be further appreciated from FIG. 8 that inputs corresponding to "readback", "enter", and "exit" are provided.

The readback input obtains a read back (using a visual (preferably large-type) display, or an audio playback) of what was entered prior to inputting the "readback" command.

The "enter" command causes the group of input items to be recognized as a collective whole. This is used, for example, after inputting all of the digits of a PIN code, in the manner described above, so that the PIN code can be recognized as a whole.

The "exit" command simply exits from the current mode of the display screen (for example, moving from a deposit screen back to a main menu type display).

As before, the use of the display screen 10 may be supplemented by audio feedback provided by a conventional sound generating device (not shown) that emits sound through one or both the handset 14 and speakers 12, such a conventional, commercially available, computer sound card. This is particularly helpful for a blind customer using the touch screen, so that he/she can gauge where to stop along the touch scanning zone 10b, so as to input a desired item.

Figure 5:
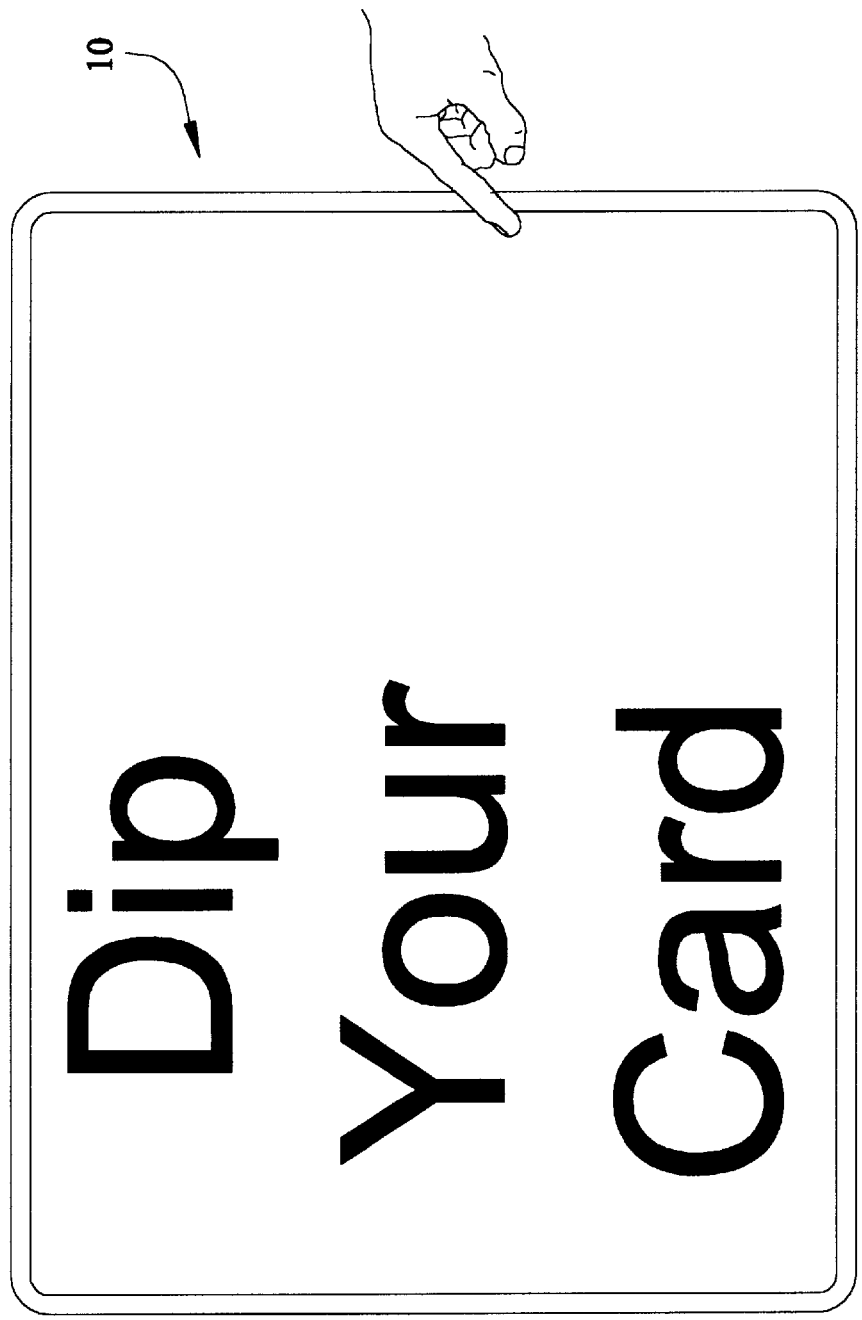
FIG. 5 illustrates a fully-enlarged screen display.

Visual feedback can also be provided by the display screen 10 itself, either using normal sized text, as in FIG. 3, for example, or enlarged text, as in FIG. 5, for example, or a combination thereof, as in FIG. 4. for example.

Of course, a combination of audio and visual feedback can also be provided.

It can be seen that by providing an elongate touch scanning zone 10b along, for example, one edge of the display screen 10, allows a blind or visually impaired customer to "expect" where to contact the screen.

Conventional touch sensitive screens, however, frequently use representations of keypads or the like. Therefore, in order to properly use such a touch sensitive screen, one must be able to know where and when to place one's finger(s) across the whole expanse of the screen. This is obviously a hardship for those who cannot see or who have difficulty seeing.

Finally, the features of the present invention that make it easier for the blind and visually impaired to use an ATM are also useful to a sighted person using the same ATM. Therefore, an ATM according to the present invention is equally useful to the sighted, the blind, and the visually impaired. In this regard, a provision could be made to enable a customer to indicate his need for features such as large-type visual displays. The other features of the invention described above are generally expected to be unobtrusive to a sighted customer using the same ATM.

In use, therefore, a customer would see a display on display screen 10 such as shown in FIG. 3. This display, as mentioned above, may be supplemented by a recorded welcome message, or the like, broadcast through one or both of speakers 12 and handset 14.

As mentioned before, the visual display could also a combination of large-type and normal text, as shown in FIG. 4, or all large-type text, as shown in FIG. 5.

Simultaneously with or after displaying the prompt to insert a magnetic stripe access card, the signaling indicator 40, 42 on the card reader 24, 26 would be illuminated to indicate the location where the card is to be inserted.

Figure 6:
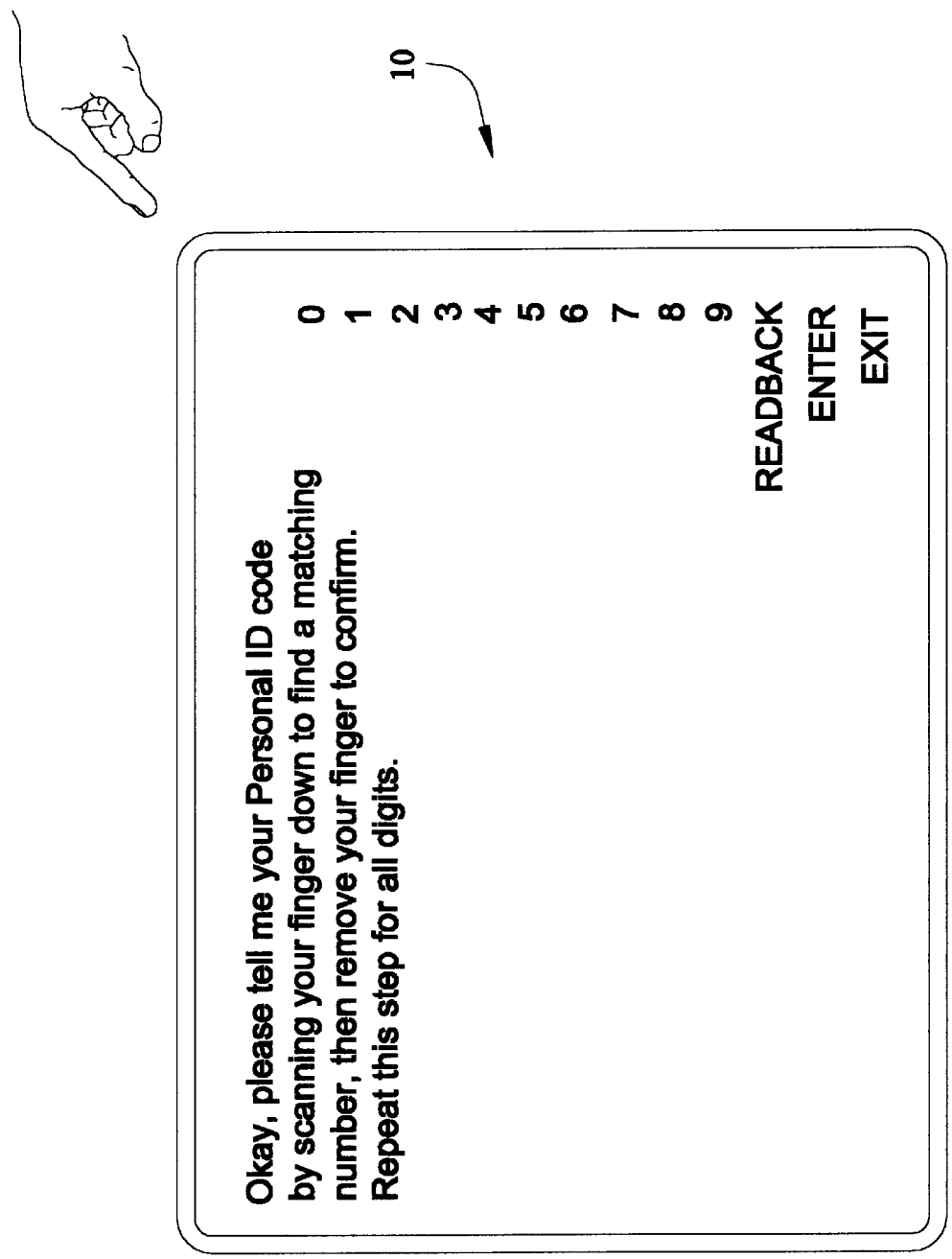
FIG. 6 illustrates a screen display associated with prompting an input, using a touch scanning zone on the edge of the display screen.

FIGS. 6–8 illustrate, as an example of using the display screen 10 according to the present invention, the process of entering a PIN code.

FIG. 6 illustrates an initial display prompting the customer to enter a PIN code. To the extent that the customer might be blind, or otherwise unable to read the display screen 10, a corresponding verbal prompt is transmitted through the speakers 12 (not illustrated in this Figure) or through handset 14.

As mentioned above, the display screen 10 is provided with a touch scanning zone that extends along a known, easy to recognize portion of the display screen 10, such as along the right side edge, as seen in FIG. 6. Therefore, a blind or visually impaired customer can assuredly expect where to place a fingertip. Preferably, display screen 10 also visually indicates the selection items along the touch scanning zone, such as the numbers 0–9 and three commands, as seen in FIGS. 6–8. This makes the display screen 10 also useful for sighted people.

FIG. 7 illustrates a step of initially contacting the display screen 10, at one end of the plurality of selection items, for example.

FIG. 8 illustrates a step of sliding a fingertip down the surface of the screen until reaching, for example, the number 7, and then removing the fingertip for the surface of the screen, whereby the number 7 is recognized by the ATM.

After entering the entire PIN code, the customer can input the readback command, as described above, so that the entire PIN code is repeated to the customer (either audibly, visually, or both) for verification.

Once the customer is satisfied that the PIN code is accurate, the enter command is input, so that the PIN code is fed to the ATM, thereby permitting access to banking functions.

If the customer changes his mind, for example, the exit command can be input, so that the display changes to, for example, a main menu display.

While the present invention has been described with respect to what are believed to be the most practical embodiments thereof, it is particularly noted that this is by way of example only, and appropriate modifications and variations thereof are possible within the spirit and scope of the claims appended hereto. For example, it will be recognized to those skilled in the art that the touch-sensitive screen need not be a "display" screen per se, especially in the context of use by a blind customer. Therefore, according to the present invention, the input interface may be a touch-sensitive screen that does not display images, words, etc. It will be appreciated, however, that using a touch-sensitive visual display advantageously enhances the usefulness of the ATM across a spectrum of sighted, visually impaired, and blind customers.

What is claimed is:

1. An automated teller machine (ATM) that provides a visually impaired person with assistance in performing a transaction, comprising:

a display screen having a visual display portion and a separate, touch-sensitive scanning zone at a predetermined, fixed location, said scanning zone having a plurality of adjacent, fixed input areas each for generating an input signal for controlling the operation of said ATM in performing said transaction, said scanning zone adapted to generate said input signal in correspondence to sensing a track of coordinates along which sliding contact is maintained and then released within said input area;

at least one ATM system component for performing an ATM function required by said transaction in response to said input signal, said at least one ATM system component disposed adjacent to said display screen;

a selectively actuable light source disposed adjacent to said at least one ATM system component, said light source illuminable to provide a coarse visual signal in response to said input signal and in conjunction with the utilization of said ATM system component to direct said visually impaired person in locating said ATM system component used in performing said transaction; and a selectively actuable audio system disposed adjacent to said display screen, said audio system for emitting sound and verbal instructions in coordination with the illumination of said light source for assisting said visually impaired person in performing said transaction.

2. An automated teller machine as recited in claim 1, wherein said at least one ATM system component comprises a component selected from the group consisting of an access control device, a cash dispensing mechanism, a deposit intake mechanism and a printer.

3. An automated teller machine as recited in claim 1, wherein said input/output device and said at least one ATM system component are identified by a Braille label disposed at least adjacent thereto.

4. An automated teller machine as recited in claim 1, wherein said light source is a light-emitting diode(LED).

5. An automated teller machine as recited in claim 1, wherein said audio system comprises a computer sound card.

6. An automated teller machine as recited in claim 1, wherein said audio system comprises at least a first speaker and a second speaker, and further comprising a hand set containing one of said first speaker and said second speaker.

7. An automated teller machine as recited in claim 1, wherein said audio system comprises a speaker for emitting sound.

8. An automated teller machine as recited in claim 7, further comprising a hand set containing said speaker.

9. An automated teller machine as recited in claim 1, wherein contacting each of said plurality of input areas causes the display of a corresponding image on said visual display portion.

10. An automated teller machine as recited in claim 9, wherein said access control device is a transport-type magnetic stripe card reader.

11. An automated teller machine as recited in claim 9, wherein said access control device is a dip-type magnetic stripe card reader.

12. An automated teller machine (ATM) that provides a visually impaired person with assistance in performing a transaction, comprising:

a touch-sensitive display screen for generating an input signal for controlling the operation of said ATM in performing said transaction, said touch-sensitive display screen comprising a visual display portion and a separate, single touch-sensitive scanning zone at a fixed, tactilely distinguishable location within said display screen, said scanning zone having a plurality of contiguous, fixed input areas each for providing said input signal upon the release of a sliding contact of said visually impaired person within said touch-sensitive scanning zone;

at least one ATM system component for performing an ATM function required by said transaction in response to said input signal, said at least one ATM system component disposed adjacent to said input/output device;

a selectively actuable light source disposed adjacent to said at least one ATM system component, said light source illuminable to provide a coarse visual signal in response to said input signal and in conjunction with the utilization of said ATM system component to direct said visually impaired person in locating said ATM system component used in performing said transaction; and a selectively actuable audio system disposed adjacent to said display screen, said audio system for emitting sound and verbal instructions in coordination with the illumination of said light source for assisting said visually impaired person in performing said transaction.

13. An automated teller machine as recited in claim 12, wherein said audio system comprises a computer sound card.

14. An automated teller machine as recited in claim 12, wherein said audio system comprises at least a first speaker and a second speaker, and further comprising a hand set containing one of said first speaker and said second speaker.

15. An automated teller machine as recited in claim 12, wherein contacting each of said plurality of input areas causes the display of a corresponding image on said visual display portion.

16. An automated teller machine as recited in claim 12, wherein said at least one ATM system component comprises a cash dispensing mechanism.

17. An automated teller machine as recited in claim 12, wherein said at least one ATM system component comprises a deposit intake mechanism.

18. An automated teller machine as recited in claim 12, wherein said at least one ATM system component comprises a printer.

19. An automated teller machine as recited in claim 12, wherein said touch sensitive display screen and said at least one ATM system component are identified by a Braille label disposed at least adjacent thereto.

20. An automated teller machine as recited in claim 12, wherein said light source is a light-emitting diode (LED).

21. An automated teller machine as recited in claim 12, wherein said audio system comprises a speaker for emitting sound.

22. An automated teller machine as recited in claim 21, further comprising a hand set containing said speaker.

23. An automated teller machine as recited in claim 12, wherein said at least one ATM system component comprises an access control device.

24. An automated teller machine as recited in claim 23, wherein said access control device is a transport-type magnetic stripe card reader.

25. An automated teller machine as recited in claims 23, wherein said access control device is a dip-type magnetic stripe card reader.

26. An automated teller machine (ATM) that provides a visually impaired person with assistance in performing a transaction, comprising:

an access control device for providing access to the functions of said ATM; a touch-sensitive display screen having a visual display portion and separate, single touch-sensitive scanning zone at a fixed, tactilely distinguishable location for providing an input signal for controlling the operation of said ATM in performing said transaction, said input signal representing one of a plurality of selections said touch-sensitive scanning zone having a plurality of contiguous, fixed input signal locations each corresponding to one of said plurality of selections, and wherein said touch scanning zone senses a track of coordinates along which sliding contact is made and generates said input signal upon the release of said sliding contact;

a cash dispensing mechanism for distributing currency based on said transaction;

a first and second selectively actuable light source respectively disposed adjacent to said control device and said cash dispensing mechanism, each of said first and second light source illuminable to provide a coarse visual signal in response to said input signal and in conjunction with the respective utilization of said control device and said cash dispensing mechanism to direct said visually impaired person in locating said control device and said cash dispensing mechanism during said transaction; and a selectively actuable audio system disposed adjacent to said display screen, said audio system for emitting sound and verbal instructions in coordination with the illumination of said first and second light sources for assisting said visually impaired person in performing said transaction.

27. An automated teller machine as recited in claim 26, further comprising:

an intake mechanism for receiving a deposit within said ATM;

a printer for printing a receipt of said transaction;

a third and fourth selectively actuable light source respectively disposed adjacent to said intake mechanism and said printer, each of said third and fourth light source illuminable to provide a coarse visual signal in response to said input signal and in conjunction with the respective utilization of said intake mechanism and said printer to direct said visually impaired person in locating said intake mechanism and said printer during said transaction; and wherein said audio system further emits sound and verbal instructions in coordination with the illumination of said third and fourth light sources for assisting said visually impaired person in performing said transaction.

28. A method of providing assistance to a visually impaired person in the operation of an automated teller machine (ATM) in performing a transaction, comprising:

(a) receiving an input signal from the visually impaired person from the release of a sliding contact within a touch-sensitive scanning zone positioned at a fixed, tactilely distinguishable location adjacent to a separate display portion within a display screen, wherein the scanning zone includes a plurality of contiguous, fixed input areas each having a corresponding one of said input signal;

(b) selectively actuating audible sounds and verbal operating instructions during the operation of the ATM in response to the input signal, where the audible sounds and verbal operating instructions direct the visually impaired person in using the at least one ATM system component; and (c) selectively illuminating a light source disposed adjacent to the at least one ATM system component, in coordination with providing the audible sounds and verbal operating instructions and in response to the input signal, wherein the light source is selectively illuminated in a sequence corresponding to the steps of the transaction and provides a coarse visual signal that aids the visually impaired person in locating the at least one ATM system component used in performing the transaction.

29. A method of providing assistance in the operation of an automated teller machine as recited in claim 28, wherein performing an ATM function comprises performing a function selected from the group consisting of accessing the ATM using a control device, dispensing funds using a cash dispensing mechanism, receiving a deposit using a deposit intake mechanism, and printing a transaction record using a printer.

30. A method of providing assistance in the operation of an automated teller machine as recited in claim 28, wherein selectively actuating audible sounds and verbal operating instructions comprises emitting sound from a speaker.

31. A method of providing assistance in the operation of an automated teller machine as recited in claim 28, wherein selectively actuating audible sounds and verbal operating instructions comprises emitting sound from a speaker within a hand set.

32. A method of providing assistance in the operation of an automated teller machine as recited in claim 28, further comprising:

receiving a readback signal; and repeating the received input signal automatically via the ATM so that the visually impaired person may verify the accuracy of the input signal.

33. A method of providing assistance in the operation of an automated teller machine as recited in claim 32, wherein repeating the received PIN is performed by displaying the received PIN on the display portion.

34. A method of providing assistance in the operation of an automated teller machine as recited in claim 32, wherein repeating the received PIN is performed by audibly reciting the PIN via an audio system.

35. A method of providing assistance in the operation of an automated teller machine as recited in claim 32, wherein the input signals are received from a display screen having a visual display portion and a separate, touch-sensitive scanning zone at a fixed, predetermined location, the scanning zone having a plurality of adjacent, fixed input areas each for generating the input signal for controlling the operation of the ATM, the scanning zone adapted to generate the input signal in correspondence to sensing a track of coordinates along which sliding contact is maintained and then released within the input area.

36. A method of providing assistance in the operation of an automated teller machine as recited in claim 32, wherein receiving the input signal generates one of a plurality of menus capable of being displayed on the display portion, each of the plurality of menus having a corresponding set of selections associated with the plurality of input areas.

37. A method of providing assistance in the operation of an automated teller machine as recited in claim 32, wherein performing an ATM function comprises performing a function selected from the group consisting of accessing the ATM using a control device, dispensing funds using a cash dispensing mechanism, receiving a deposit using a deposit intake mechanism, and printing a transaction record using a printer.

38. A method of providing assistance in the operation of an automated teller machine as recited in claim 32, wherein receiving the input signal further comprises receiving a series of the input signals designated as a personal identification number (PIN) of the visually impaired person, and wherein repeating the input signal further comprises repeating the series of input signals automatically via the ATM for accuracy verification.

39. A method of providing assistance in the operation of an automated teller machine as recited in claim 32, further comprising receiving an enter signal only after repeating the received input signal.

\* \* \* \* \*